US011256607B1

(12) United States Patent
Dhrolia et al.

(10) Patent No.: US 11,256,607 B1
(45) Date of Patent: Feb. 22, 2022

(54) ADAPTIVE RESOURCE MANAGEMENT FOR INSTANTLY PROVISIONING TEST ENVIRONMENTS VIA A SANDBOX SERVICE

(71) Applicant: MICROSOFT TECHNOLOGY LICENSING, LLC, Redmond, WA (US)

(72) Inventors: Raj Moizbhai Dhrolia, Redmond, WA (US); Jianfeng Cai, Redmond, WA (US); Nir Zvi Yurman, Redmond, WA (US); Sophie Dasinger, Cambridge, MA (US); Peter Kenneth Harwood, Bellevue, WA (US); Jeffrey Earl Steinbok, Redmond, WA (US); Peter Erling Hauge, Marysville, WA (US); Nicola Greene Alfeo, Seattle, WA (US); Sandeep Kumar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/151,588

(22) Filed: Jan. 18, 2021

(51) Int. Cl.
*G06F 9/44* (2018.01)
*G06F 11/36* (2006.01)
(Continued)

(52) U.S. Cl.
CPC ...... *G06F 11/3664* (2013.01); *G06F 9/45533* (2013.01); *G06F 21/53* (2013.01); *G06F 8/65* (2013.01); *G06F 2221/034* (2013.01)

(58) Field of Classification Search
CPC .. G06F 11/3664; G06F 9/45533; G06F 21/53; G06F 8/65; G06F 2221/034
(Continued)

(56) References Cited

U.S. PATENT DOCUMENTS 8,181,159 B2 5/2012 Khalil et al.
8,533,676 B2 9/2013 Watters et al.
(Continued)

OTHER PUBLICATIONS

"Deliver Complex Test Lab Environments on Demand", Retrieved from: https://info.quali.com/hubfs/Quali_Network-Security-slash-your-dev-test-and-lab-infrastructure.pdf?hsCtaTracking=1a63f3f6-7e84-472f-b80e-dd051ba87620%7C628fcb1d-0524-4739-b2c7-ec7800421040&submissionGuid-765951e8-fd4d-4a5e-8cc0-600419c58fd9, Retrieved on Nov. 17, 2020, 2 Pages.
(Continued)

*Primary Examiner* — Chuck O Kendall
(74) *Attorney, Agent, or Firm* — Jacob P. Rohwer; Newport IP, LLC

(57) ABSTRACT

Disclosed herein is a system for providing a test environment, composed of one or more virtual machines, to a developer instantly in response to a checkout request from the developer. To do this, a sandbox service implements a smart, tiered approach to creating and provisioning virtual machines that compose the test environments. The approach is flexible and elastic in nature, so that the developers do not have to wait an extended period of time for a test environment, yet the costs associated with configuring the virtual machines (e.g., storage and compute costs) are minimized. For example, the sandbox service can use historical data to predict a number of checkout requests expected for a first time interval (e.g., one day), a second time interval (e.g., thirty minutes), and a third time interval (e.g., five minutes). The sandbox service can then configure virtual machines into different states based on the predicted numbers.

20 Claims, 10 Drawing Sheets

(51) Int. Cl.

| | |
|---|---|
| ***G06F 21/53*** | (2013.01) |
| ***G06F 9/455*** | (2018.01) |
| *G06F 8/65* | (2018.01) |

(58) Field of Classification Search

USPC .......................................................... 717/124

See application file for complete search history.

(56) References Cited

U.S. PATENT DOCUMENTS

| | | | | |
|---|---|---|---|---|
| 8,762,787 | B2 | 6/2014 | Lam et al. | |
| 9,015,712 | B1 | 4/2015 | Hodge et al. | |
| 10,313,192 | B2 | 6/2019 | Macatangay et al. | |
| 2011/0055714 | A1 | 3/2011 | Vemulapalli et al. | |
| 2016/0004864 | A1* | 1/2016 | Falk | G06F 21/56 726/23 |
| 2019/0220262 | A1* | 7/2019 | Fox | G06F 8/41 |

OTHER PUBLICATIONS

"Saving a Guest Virtual Machine as a Template", Retrieved from: https://docs.oracle.com/cd/cloud-control-13.3/EMCLO/GUID-596D0237-81F8-4DD6-926F-98C4A23CB513.htm#EMCLO516, Retrieved on Nov. 17, 2020, 35 Pages.

Mezger, et al., "Enable Agile Mainframe Development, Test, and CI/CD with AWS and Micro Focus", Retrieved from: https://aws.amazon.com/blogs/industries/enable-agile-mainframe-development-test-and-ci-cd-with-aws-and-micro-focus/, Mar. 26, 2020, 15 Pages.

Pelluru, et al., "Architecture Fundamentals in Azure Lab Services", Retrieved from: https://docs.microsoft.com/en-us/azure/lab-services/classroom-labs-fundamentals, Sep. 16, 2020, 4 Pages.

* cited by examiner

ADAPTIVE RESOURCE MANAGEMENT FOR INSTANTLY PROVISIONING TEST ENVIRONMENTS VIA A SANDBOX SERVICE

BACKGROUND

Providing an optimal user experience is an important aspect for cloud-based platforms that offer network services. As cloud computing gains popularity, more and more data and/or applications (e.g., functions, etc.) are stored and/or provided online via network connections. In many scenarios, a cloud-based platform may provide a service to thousands or millions of end-users (e.g., customers, clients, tenants, etc.) geographically dispersed around a country, or even the world. In order to provide this service, a cloud-based platform often includes different resources, such as server farms, hosted in various datacenters.

To ensure an optimal user experience, features of the service (e.g., an application feature) must continually be maintained, improved, introduced, and/or removed via updates (e.g., a code update, a program update, etc.). The update is typically configured by an individual developer, or a group of developers, tasked with managing a particular feature offered by an application of the service. An update that has not been tested before being deployed to resources that are exposed to the end-users greatly increases a likelihood of regressions or problems that can result in functionality loss and/or sub-optimal experiences for the end-users.

Consequently, many entities that operate cloud-based platforms provide a sandbox service to their developers, so that an update can be tested before the update is deployed to the resources that are exposed to the end-users. A "sandbox" is a security mechanism that enables code and/or programs to be executed in a safe environment so that failures and/or software vulnerabilities can be mitigated (e.g., prevented from spreading to, or harming, resources outside the safe environment).

Conventional approaches to implementing a sandbox service provision these safe environments for testing from scratch, which results in large configuration costs and down time due to a delay in creating the safe environments. For instance, a conventional sandbox service waits for a developer to request a safe environment to test a feature. After the request is received, a backend lab that is part of the sandbox service typically consumes storage and compute resources of a cloud-based platform, at a large cost, to create one or more virtual machines that compose one of these safe environments that can be used by the developer. In addition to costs, it often takes an extended period of time (e.g., roughly an hour) to create the one or more virtual machines, which means that the developer requesting the safe environment has to wait in order to test the feature. This can make the experience a frustrating one for the developer.

It is with respect to these and other considerations that the disclosure made herein is presented.

SUMMARY

The techniques disclosed herein implement a sandbox service that effectively addresses the costs and the delay associated with provisioning safe environments for testing. As described herein, a sandbox is referred to as a test environment, and an individual test environment can be configured with one or more virtual machines so a feature of a service can be tested. The sandbox service is configured to provide a test environment to a developer instantly (e.g., less than a second of wait time) in response to a checkout request from the developer. To do this, the sandbox service implements a smart, tiered approach to creating and provisioning virtual machines that compose test environments. The approach is flexible and elastic in nature, so that the developers do not have to wait an extended period of time for a test environment, yet the costs associated with configuring the virtual machines (e.g., storage and compute costs) are minimized.

The sandbox service described herein uses historical data to predict a demand for test environments. The demand can be based on a number of developers tasked with managing the features of the service applications and/or an update schedule that reflects how often updates are pushed to maintain, improve, introduce, and/or remove such features. As described above, the costs to configure and provision a virtual machine as part of a sandbox are great for an entity operating a cloud-based platform, due to the amount of storage and compute resources needed. To avoid or limit such costs, a sandbox can be configured and provisioned after a request for sandbox is received so that the supply exactly matches the demand. However, the problem with this approach is that the developer requesting the sandbox has to wait for a time period up to an hour before the sandbox is provisioned.

To solve this problem, the sandbox service described herein creates a large number of virtual machines, useable within a test environment, in advance of receiving checkout requests from developers. In this way, test environments can be instantly ready for use by developers. To do this, the sandbox creates a "template image" to be pre-installed on the virtual machines. For example, the sandbox service spends a one-time cost to configure the service on a virtual machine, and then saves the state of the fully provisioned virtual machine as the template image. The template image can then be pre-installed on other virtual machines to save compute costs.

In various examples, developers of the service may want to test a feature in different types of test environments. Accordingly, the sandbox service can create a template image for different types of test environments. In one example, different types of test environments can be based on different builds of the service released in a periodic manner or in accordance with a preset schedule (e.g., every twelve hours, every day, every week, etc.). In additional examples, different types of test environments can correspond to different use cases (e.g., debugging, shipping, etc.), an operating system version, etc.

The sandbox service is built and operated using common cloud-based platform components. Consequently, the sandbox service described herein does not need to allocate resources to dedicated labs that are tasked with creating a large number of test environments from scratch. To provide an optimal checkout experience for developers (e.g., the instant provisioning of virtual machines), the sandbox service can use historical data to model and predict an expected number of checkout requests for a time period using similar previous time period(s). The time period being modeled, and for which the predictions are determined, can be analyzed in order to implement a tiered approach that pools virtual machines reserved for test environments into different states, as further described herein.

Accordingly, the disclosed sandbox service can use the historical data to predict: a first number of virtual machines to be reserved from the cloud-based platform for a first time interval (e.g., a large time interval such as one, two, or three days), a second number of virtual machines to be created from the reserved pool but should not yet be running (e.g., these virtual machines are in a "stopped" state), and a third number of virtual machines to be run so they are available for immediate checkout (e.g., these virtual machines are in a "running" state and can be provisioned to a developer without delay, e.g., within a second). The first number mentioned above can be constrained by an amount of resources the cloud-based platform will allow the sandbox service to procure.

The number of virtual machines used in each test environment can vary based on type. Typically, a test environment is composed of one or maybe two virtual machines. But a test environment can also be composed of more than two virtual machines. Accordingly, the number of virtual machines to be reserved, created, and/or run based on a number of expected checkout requests can be based on a type of test environment and a predetermined number of virtual machines (e.g., one, two, three, etc.) configured or needed to implement the type of test environment. In some embodiments, the number of virtual machines to be reserved, created, and/or run based on a number of expected checkout requests can be based on an average number of virtual machines used per test environment or across a number of test environments, calculated based on historic data (e.g., a 1-to-1 virtual machine per environment ratio, a 2-to-1 virtual machine per environment ratio, a 1.2-to-1 virtual machine per environment correspondence, etc.). Using the respective examples from the preceding sentence, if twenty checkout requests for environments are anticipated, then the sandbox service would need to ready twenty virtual machines, forty virtual machines, and twenty-four virtual machines for use.

Outlining a more specific example scenario, if the sandbox service predicts that one thousand test environments are to be requested for checkout by developers during the current day (e.g., a twenty-four hour period), the sandbox service informs the cloud-based platform of this predicted use and reserves an allocation. However, at this point, the sandbox service but does not create virtual machines for this number of test environments all at once. Rather, the sandbox service predicts what the expected number of checkout requests is for the next thirty minutes (e.g., twenty checkout requests in this example scenario). The sandbox service can then create virtual machines (e.g., twenty—assuming a one-to-one virtual machine per test environment ratio) for this expected number of checkout requests using a template image. That is, the sandbox service pre-installs the template image on twenty virtual machines from the one-thousand virtual machines reserved via the allocation. These twenty virtual machines are created but not yet running, so they are in a stopped state, where there are storage costs but no compute costs. The sandbox service further predicts what the expected number of checkout requests is for the next five minutes (e.g., five checkout requests in this example scenario). The sandbox service then transitions a corresponding number of virtual machines (e.g., five—again assuming a one-to-one virtual machine per test environment ratio) that are already created, but in the stopped state, into a running state. Consequently, these five virtual machines are available for instant checkout, to meet the expected demand over the next five minutes.

Based on this tiered approach that pools an allocation of virtual machines for sandboxing purposes into different states, the sandbox service is able to reduce cost by not configuring a large number of virtual machines into each of the stopped state and the running state all at once. Based on one calculation, a running virtual machine is estimated to cost an entity operating a cloud-based platform about $500 per month due to the compute and storage resources consumed. The most expensive cost is the compute cost for a running virtual machine, and this cost is only paid for the least amount of virtual machines (e.g., five in the example of the preceding paragraph). A lesser cost is the storage cost for storing a created virtual machine, and this cost is paid for a slightly larger number of virtual machines (e.g., twenty in the example of the preceding paragraph).

In various examples, the sandbox service can establish thresholds for the respective pools (e.g., stopped state and running state) using the predicted numbers. This helps ensure that the imminent checkout demand is addressed, yet costs are reduced. Moreover, the sandbox service can use the thresholds to manage the pools of virtual machines in the different states. That is, if a virtual machine in a running state is checked out as part of a test environment, then the sandbox service transitions a virtual machine in the stopped state into the running state to ensure the threshold number of readied virtual machines in the running state is maintained (e.g., five in the specific example above). Similarly, the sandbox service can also create another virtual machine in the stopped state, from the reserved number of virtual machines, to ensure the threshold number of created but not running virtual machines is maintained (e.g., twenty in the specific example above). Consequently, the thresholds used for pool management can be determined based on predicted demand, as well as the known amount of time taken to start a created virtual machine (e.g., roughly five minutes) and the known amount of time taken to create a virtual machine using the template image (e.g., roughly one hour).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for providing a test environment, composed of one or more virtual machines, to a developer instantly (e.g., less than a second of wait time) in response to a checkout request from the developer. To do this, a sandbox service implements a smart, tiered approach to creating and provisioning virtual machines that compose the test environments. The approach is flexible and elastic in nature, so that the developers do not have to wait an extended period of time for a test environment, yet the costs associated with configuring the virtual machines (e.g., storage and compute costs) are minimized.

For example, as discussed herein, the sandbox service can use historical data to predict a number of checkout requests expected for a first time interval (e.g., one day), a second time interval (e.g., thirty minutes), and a third time interval (e.g., five minutes). The sandbox service can then configure virtual machines into different states based on the predicted numbers.

Various examples, scenarios, and aspects, are described below with reference to FIGS. 1-10.

Figure 1:
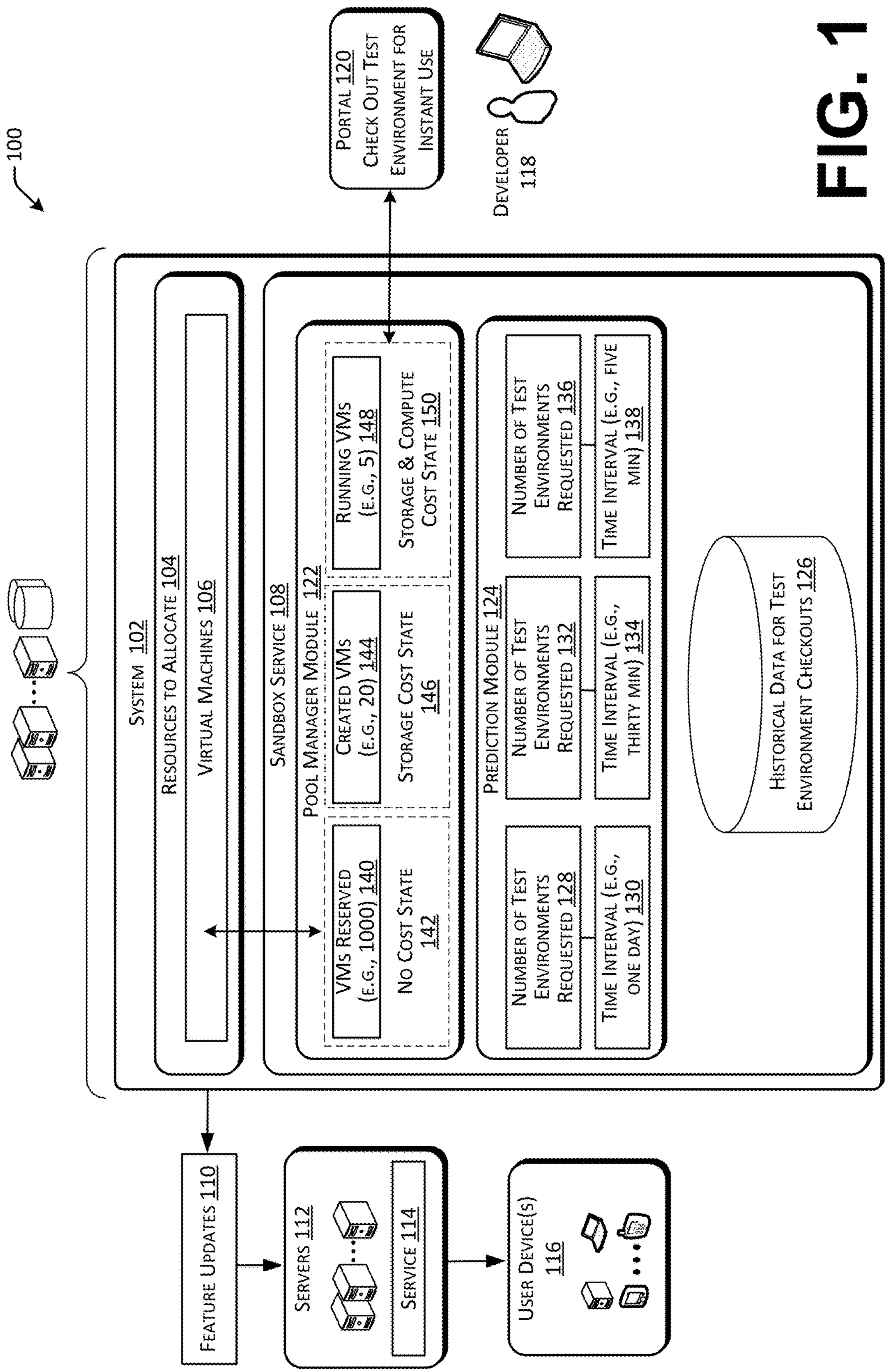
FIG. 1 is a diagram illustrating an example environment in which a system is configured to predict demand for test environments over a period of time, and manage pools of virtual machines for the test environments based on the predicted demand.

FIG. 1 is a diagram illustrating an example environment 100 in which a system 102 is configured to predict demand for test environments over a period of time, and manage pools of virtual machines for the test environments based on the predicted demand. The system 102 may be a cloud-based platform (e.g., AMAZON WEB SERVICES, MICROSOFT AZURE, etc.), or the system 102 may be part of a cloud based platform. Accordingly, the system 102 includes resources to allocate 104 for various purposes. One of the resources to allocate includes virtual machines 106.

One of the purposes for resource allocation of virtual machines 106 is for a sandbox service 108. The sandbox service 108 may be offered, by the entity operating the cloud-based platform, to developers tasked with deploying feature updates 110 to resources (e.g., servers 112) that provide a service 114 to a large number of end-user devices 116 (e.g., tenants, customers, clients, etc.). The features of the service 114 must continually be maintained, improved, introduced, and/or removed via updates (e.g., a code update, a program update, etc.) in order to ensure an optimal experience for the end-users. The servers 112 are typically part of the cloud-based platform and may be configured within the same and/or different datacenters. To this end, the end-user devices 116 may be located in different geographical regions (e.g., different states, different countries, etc.). An end-user device may include an "on-premises" server device, a smartphone device, tablet computing device, a laptop computing device, a desktop computing device, an augmented reality device, a virtual reality device, a mixed reality device, a game console, a wearable device, an Internet-of-Things (IoT) device, and so forth.

The sandbox service 108 is configured to enable a developer 118 to check out a test environment for instant use, via a portal 120. For example, the developer 118 may be working on a new feature for the service 114 (e.g., a document storage and document sharing service). Ideally, the developer 118 has time to test the new feature before checking in the actual code for deployment. The developer 118 may have previously written unit-tests and medium tests, but the developer 118 still needs a full end-to-end working environment to fully determine that the new feature, integrated within the broader service 114, behaves as expected. At this time, the developer 118 browses to the portal 120, and checks out a test environment via the sandbox service 108.

The sandbox service 108 includes a pool manager module 122 and a prediction module 124, each of which is further described herein. The number of illustrated modules is just an example, and the number can vary higher or lower. That is, functionality described herein in association with the illustrated modules can be performed by a fewer number of modules or a larger number of modules on one device or spread across multiple devices. The sandbox service 108 also includes a database 126 that stores historical data for test environment checkouts.

As further described herein, the sandbox service 108 implements a smart, tiered approach to creating and provisioning virtual machines that compose test environments. The approach is flexible and elastic in nature, so that a developer 118 does not have to wait an extended period of time for a test environment, yet the costs associated with configuring the virtual machines (e.g., storage and compute costs) are minimized.

Accordingly, the prediction module 124 is configured to access the database 126 storing historical data for text environment checkouts. The prediction module 124 can analyze the historical data to predict a demand for test environments. The demand can be based on a number of developers tasked with managing the features of the service 114 and/or an update schedule that reflects how often updates are pushed to maintain, improve, introduce, and/or remove such features.

As illustrated, the prediction module 124 can predict: a first number of test environments 128 to be requested during a first time interval 130 (e.g., one day), a second number of test environments 132 to be requested during a second time interval 134 (e.g., thirty minutes) that is smaller than the first time interval, and a third number of test environments 136 to be requested during a third time interval 138 (e.g., five minutes) that is smaller than both the first time interval and the second time interval. The prediction module 124 can then pass these predicted numbers 128, 132, 136 to the pool manager module 122.

The pool manager module 122 is tasked with reserving virtual machines for the sandbox service 108 and managing the states of the reserved virtual machines in order to satisfy the anticipated demand for test environments, so that a developer 118 does not have to wait for a test environment for an extended period of time. Further, the management of the states of the reserved virtual machines is also implemented to manage costs in a meaningful and favorable manner.

The pool manager module 122 is configured to determine a correspondence between a number of virtual machines likely required to serve a number of predicted checkout requests for test environments. In one example, this correspondence is established based on a type of test environment. That is, a predetermined number of virtual machines (e.g., one, two, three, etc.) configured or needed to implement the type of test environment may be known to the pool manager module 122. In other examples, the number of virtual machines used in each test environment can vary, so the pool manager module 122 may establish the correspondence based on an average number of virtual machines used per test environment, calculated based on the historical data. The examples used herein are based on a one-to-one correspondence, e.g., each test environment comprises a single virtual machine. However, it is understood in the context of this disclosure, that more than one virtual machine may have to be reserved and/or pooled for each test environment or type of test environment based on the predicted numbers 128, 132, 136 of test environments requested for checkout.

The pool manager module 122 is first configured to reserve a first number of virtual machines (VMs) 140 from the resources 104 of the cloud-based platform based on the predicted number of test environments to be requested 128 during the first time interval 130. For instance, using the aforementioned one-to-one correspondence, if one thousand test environments are predicted to be requested for checkout over the next day (i.e., twenty-four hour period), then the pool manager module 122 reserves an allocation of one thousand virtual machines. There is no substantial cost associated with merely reserving the virtual machines because they have not been created, and nor are they running. Consequently, FIG. 1 illustrates these virtual machines as being in the no cost state 142.

The pool manager module 122 is next configured to create a second number of virtual machines 144, from the number of reserved virtual machines 140, based on the predicted number of test environments to be requested 132 during the second time interval 134. For instance, using the aforementioned one-to-one correspondence, if twenty test environments are predicted to be requested for checkout over the next thirty minutes, then the pool manager module 122 creates twenty virtual machines. The virtual machines are created using a template image, as described herein with respect to FIG. 2. There are storage costs associated with creating the virtual machines but there are not compute costs because these created virtual machines are not yet running. Consequently, FIG. 1 illustrates these virtual machines as being in the storage cost state 146, which may also be referred to as the “stopped” state.

The pool manager module 122 is next configured to transition a third number of virtual machines 148 from the stopped state to a running state based on the predicted number of test environments to be requested 136 during the third time interval 138. For instance, using the aforementioned one-to-one correspondence, if five test environments are predicted to be requested for checkout over the next five minutes, then the pool manager module 122 transitions five virtual machines from the stopped state to the running state so they are ready for instant use by developers. There are storage costs and compute costs associated with running the virtual machines. Consequently, FIG. 1 illustrates these virtual machines as being in the storage & compute cost state 150, which may also be referred to as the running state as mentioned above.

Based on this tiered approach that pools an allocation of virtual machines for sandboxing purposes into different states, the sandbox service 108 is able to reduce cost by not configuring a large number of virtual machines into each of the stopped state and the running state all at once.

Figure 2:
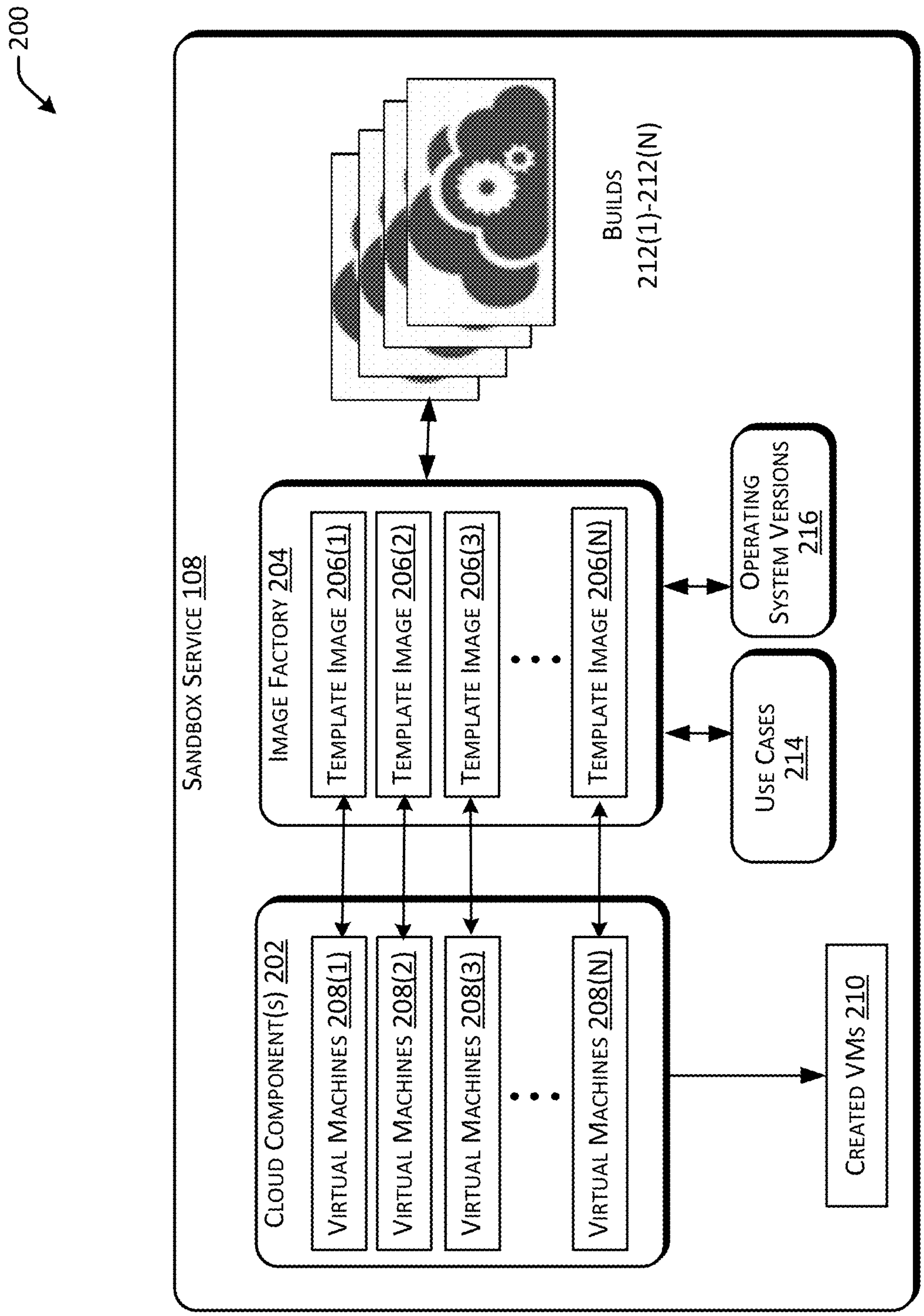
FIG. 2 is a block diagram illustrating different types of virtual machines and how each virtual machine can be efficiently created using a template image.

FIG. 2 is a block diagram 200 illustrating different types of virtual machines and how each virtual machine can be efficiently created using a template image. FIG. 2 illustrates that the sandbox service 108 is able to create virtual machines using common cloud-based platform components 202. Consequently, a cloud-based platform does not need to allocate resources to dedicated labs that are tasked with creating a large number of test environments from scratch (e.g., upon request). For instance, rather than dedicated labs, the cloud-based platform components 202 can create a group of virtual machines in the cloud.

In order to create a large number of virtual machines in advance of receiving checkout requests from developers, the sandbox service 108 employs an image factory 204 to create different types of template images 206(1)-206(N) (where N is a positive integer number such as two, three, four, five, ten, fifteen, etc.). These different types of template images 206(1)-206(N) correspond to different types of test environments. For example, the image factory 204 spends a one-time cost to configure the service on one virtual machine, and then the image factory 204 saves the state of the fully provisioned virtual machine as an individual template image. As shown, the template images 206(1)-206(N) can then be pre-installed (e.g., pre-baked) on additional sets of virtual machines 208(1)-208(N) by the common cloud-based platform components 202, without having to use dedicated labs. Once this is done, virtual machines 210 of different types are pooled into either a stopped state or a running state by the pool manager module 122, as discussed above with respect to FIG. 1.

In various examples, the different template images 206(1)-206(N) can be based on different builds 212(1)-212(N) of the service 114. For instance, a new build for the service may be released by the system 102 in a periodic manner or in accordance with a preset schedule (e.g., every twelve hours, every day, every week, etc.). In additional examples, the different template images 206(1)-206(N) can be based on different use cases 214 (e.g., debugging, shipping, etc.), different operating system versions 216, and so forth.

Furthermore, the predictions and VM pool management discussed above with respect to FIG. 1 can be implemented for each of the different types of template images 206(1)-206(N). In a specific example, the historical data can be analyzed to produce a first set of predicted numbers 128, 132, 136 for today’s build, a second set of predicted numbers 128, 132, 136 for yesterday’s build, a third set of predicted numbers 128, 132, 136 for the day before yesterday’s build, and so forth. In most scenarios, the predicted numbers become smaller as the builds become older (e.g., more stale). However, test environments for older builds are still requested by developers because older builds may be operating in a part of a datacenter implementing the cloud-based platform, and features within these older builds may still need to be updated, introduced, removed, etc.

In one embodiment, the image factory 204 only maintains template images for the last N builds (e.g., N=5, N=10) so that resources are not used on really stale builds (e.g., builds from over twenty days ago). However, the sandbox service

108 can employ the image factory 204 to create a template image for an older build, not being maintained, upon request from developer.

Figure 3:
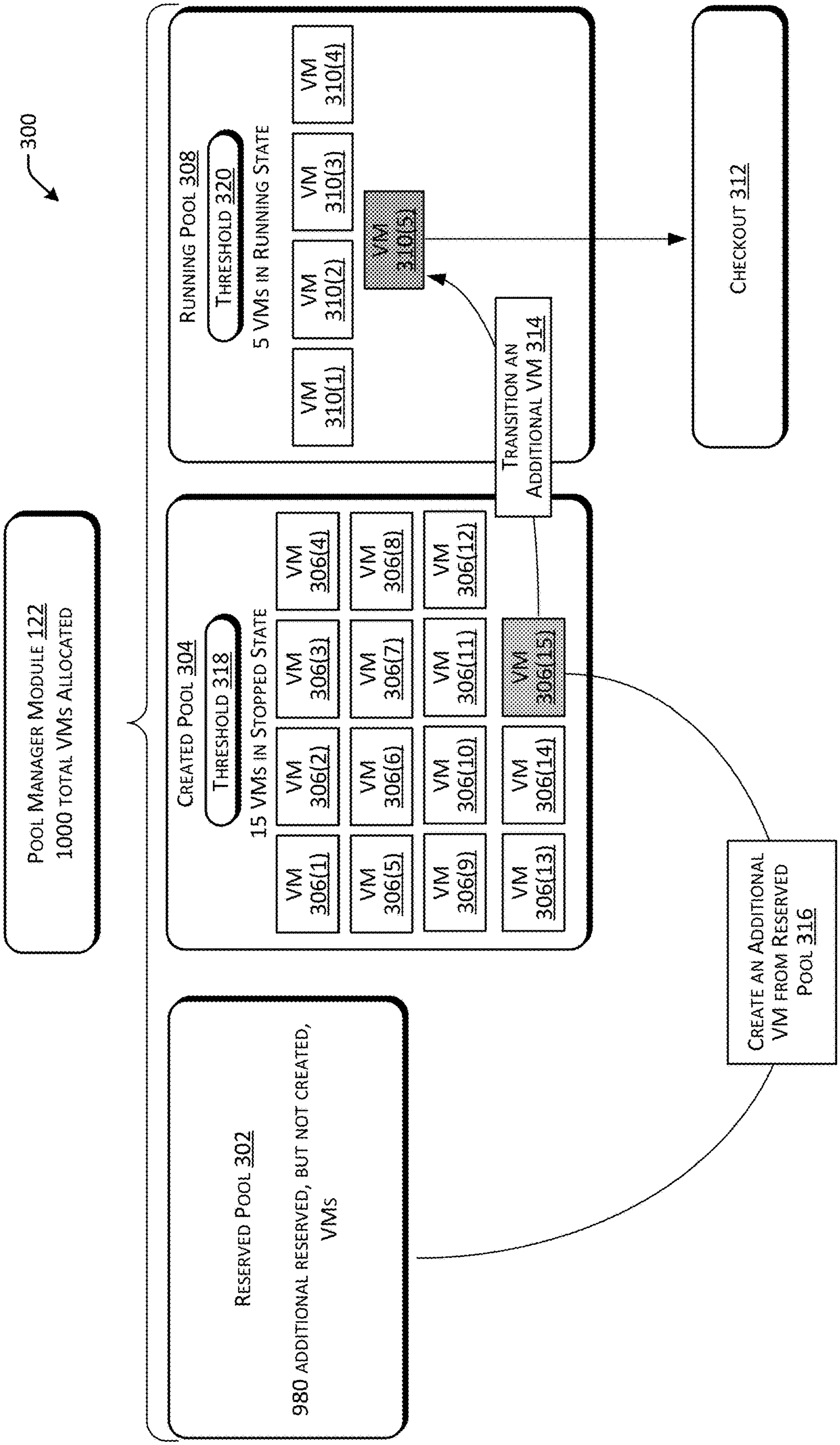
FIG. 3 is a block diagram illustrating pool management of virtual machines according to states and a request to check out a test environment.

Turning to FIG. 3, a block diagram 300 illustrating pool management of virtual machines according to states and a request to check out a test environment, is shown. FIG. 3 uses the example numbers used in FIG. 1. Accordingly, for a particular type of template image, the pool manager module 122 has reserved a total number of one thousand virtual machines for use over the first period of time (e.g., one day) based on the predictions. Twenty of these one thousand virtual machines are created and five of the twenty virtual machines are running based on the predictions.

Breaking this down into pools, FIG. 3 illustrates that nine hundred and eighty virtual machines are in a reserved pool 302, but these virtual machines have not yet been created. Fifteen virtual machines are in a created pool 304 but are stopped and not yet running. To represent the fact they have been created, these virtual machines are shown as virtual machines 306(1)-306(15). Five virtual machines are in a running pool 308 where they are ready for instant use by a developer. To represent the fact they have been created and are running, these virtual machines are shown as virtual machines 310(1)-310(5).

The pool manager module 122 can implement state transitions when a virtual machine 310(5) from the running pool 308 is requested for instant checkout 312 by a developer. As shown via the shading, the pool manager module 122 can transition 314 an additional virtual machine (e.g., VM 306(15)) from the stopped pool 304 into the running pool 308, to take the place of the checked out virtual machine 310(5). This process includes readying the virtual machine 306(15) for instant use. Similarly, the pool manager module 122 can cause an additional virtual machine to be created 316 from the reserved pool 302 in order to take the place of the virtual machine 306(15) in the created pool 304, which was transitioned into the running state. This process includes pre-installing a template image as discussed above with respect to FIG. 2.

In various examples, the pool manager module 122 can use the predicted numbers to establish thresholds 318, 320 for the respective pools (e.g., stopped pool and running pool). This helps ensure that the imminent checkout demand is addressed, yet costs are reduced. Moreover, the pool manager module 122 can use the thresholds 318, 320 to manage the pools of virtual machines in the different states, as described above. That is, if a virtual machine in a running state is checked out as part of a test environment, then the pool manager module 122 transitions a virtual machine in the stopped state into the running state to ensure the threshold number 320 of readied virtual machines in the running state is maintained (e.g., five in the example of FIG. 3). Similarly, the pool manager module 122 can also create another virtual machine in the stopped state, from the reserved number of virtual machines, to ensure the threshold number 318 of created but not running virtual machines is maintained (e.g., twenty in the example of FIG. 3). Consequently, the thresholds used for pool management can be determined based on predicted demand. The thresholds can further be determined based on the known amount of time taken to start a created virtual machine (e.g., roughly five minutes) and the known amount of time taken to create a virtual machine using the template image (e.g., roughly one hour).

As described above, the thresholds can vary based on a type of virtual machine (e.g., type of test environment). The thresholds can further vary based on geography (e.g., time of day, number of developers in a region, etc.).

Figure 4:
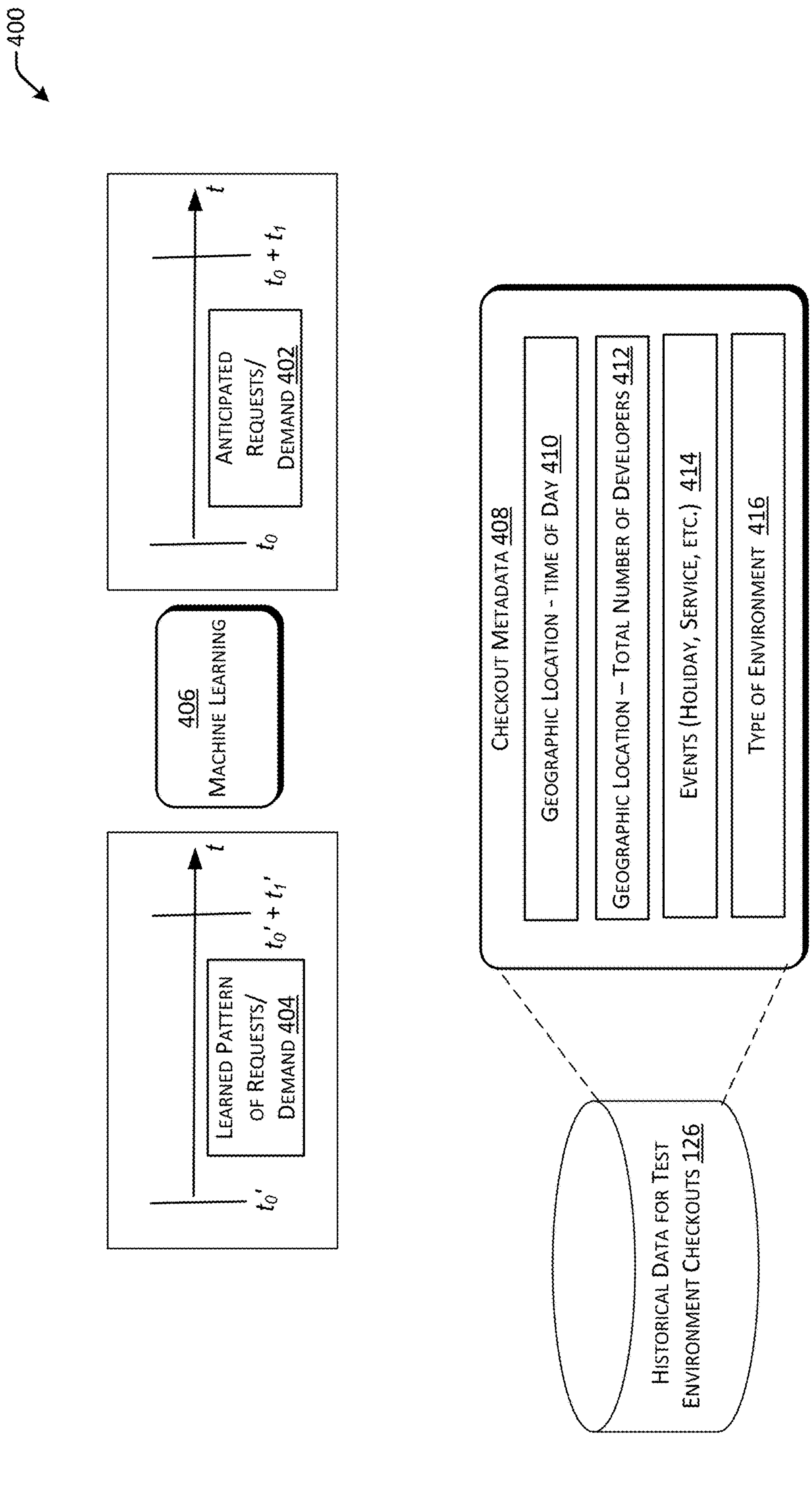
FIG. 4 is a block diagram illustrating factors in the historical data that are useable to provide more accurate and learned predictions.

FIG. 4 is a block diagram 400 illustrating factors in the historical data that are useable to provide more accurate and learned predictions. As described above, in order to provide an optimal checkout experience for developers (e.g., the instant provisioning of virtual machines), the prediction module 124 can predict an expected number of checkout requests for a time period using data historical data collected for similar previous time period(s). More specifically, the prediction module 124 is configured to anticipate checkout requests and demand 402 for a current time period (e.g., $t_0$ to $t_0+t_1$) (e.g., the first time interval 130 from FIG. 1) based on learned patterns of previous checkout requests and demand 404 for a previous time period (e.g., $t_0'$ to $t_0'+t_1'$).

In various examples, the patterns can be learned via a machine learning 406 approach. For instance, a predictive model can be applied to metadata extracted from a pattern of checkout requests that occur over the previous period of time (e.g., $t_0'$ to $t_0'+t_1'$). The predictive model can use any one of neural networks (e.g., convolutional neural networks, recurrent neural networks such as Long Short-Term Memory, etc.), Naïve Bayes, k-nearest neighbor algorithm, majority classifier, support vector machines, random forests, boosted trees, Classification and Regression Trees (CART), and so on.

As illustrated, the metadata 408 for an individual checkout that is used as a factor to predict set of numbers 128, 132, 136 can include a geographic location for which a checkout request is received 410. This is indicative of the time of day in which a checkout request is provided (e.g., more requests are likely during the day compared to night). Alternatively, a checkout request may be timestamped according to a local time for the geographic location. The metadata 408 can additionally or alternatively include a total number of developers 412, tasked with maintaining the service 114, that are located within or work from the geographic location from which a request is received. This helps capture a larger picture of a percentage of developers that are requesting a test environment during the time period. The metadata 408 can additionally or alternatively include whether the request is received during or around a specific event 414 (e.g., a Holiday, a News Publication, etc.) that has an effect on normal demand. The metadata can additionally or alternatively include a type of test environment 416 being requested, as discussed above with respect to FIG. 2.

Figure 5:
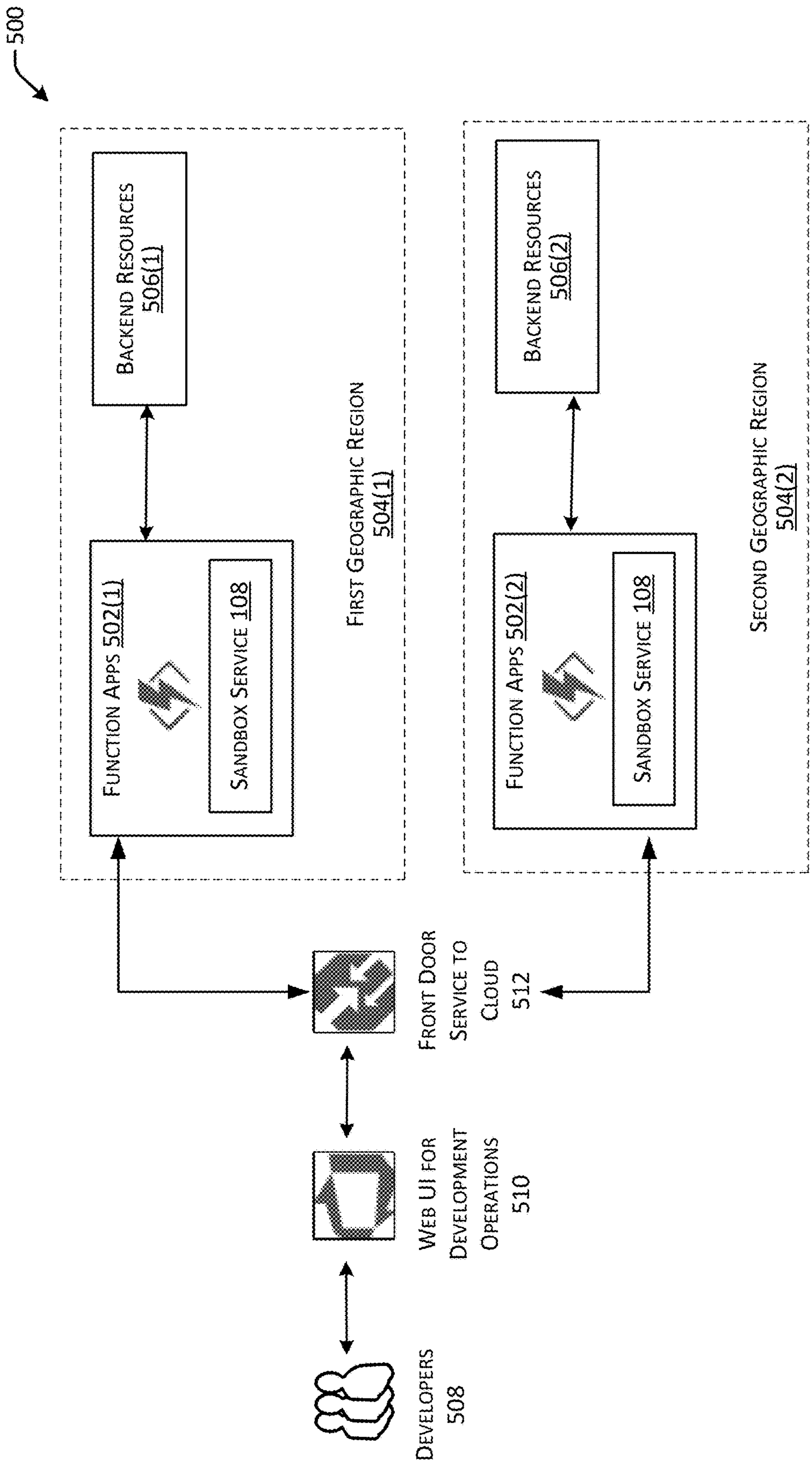
FIG. 5 illustrates a block diagram of various cloud-based platform components implementing the sandbox service.

FIG. 5 illustrates a block diagram 500 of various cloud-based platform components implementing the sandbox service 108. As shown, the sandbox service 108 is implemented via function apps components 502(1) and 502(2) which may be dispersed in different geographic regions 504(1) (e.g., Western United States) and 504(2) (e.g., Eastern United States). These function apps components 502(1) and 502(2) are always available to developers 508. Each of the geographic regions 504(1) and 504(2) may include their own backend resources 506(1) and 506(2) to separately implement the functionality described with respect to FIGS. 1-4

In this way the sandbox service 108 can be implemented in multiple geographic regions around the world. The developers 508 can access a web user interface for development operations 510, which provides a front door service to the cloud 512, which ultimately enables access to the sandbox service 108. The developers 508 can choose a function app component 502(1) and 502(2) that is closest to their current location, which greatly decreases latency and improves the experience associated with checking out a virtual machine. Furthermore, implementing the sandbox service 108 in multiple geographic regions provides continuity of service in case of a disaster or a failure, without any manual intervention (e.g., the front door service 512 can route requests to different instances of the sandbox service 108).

Figure 6:
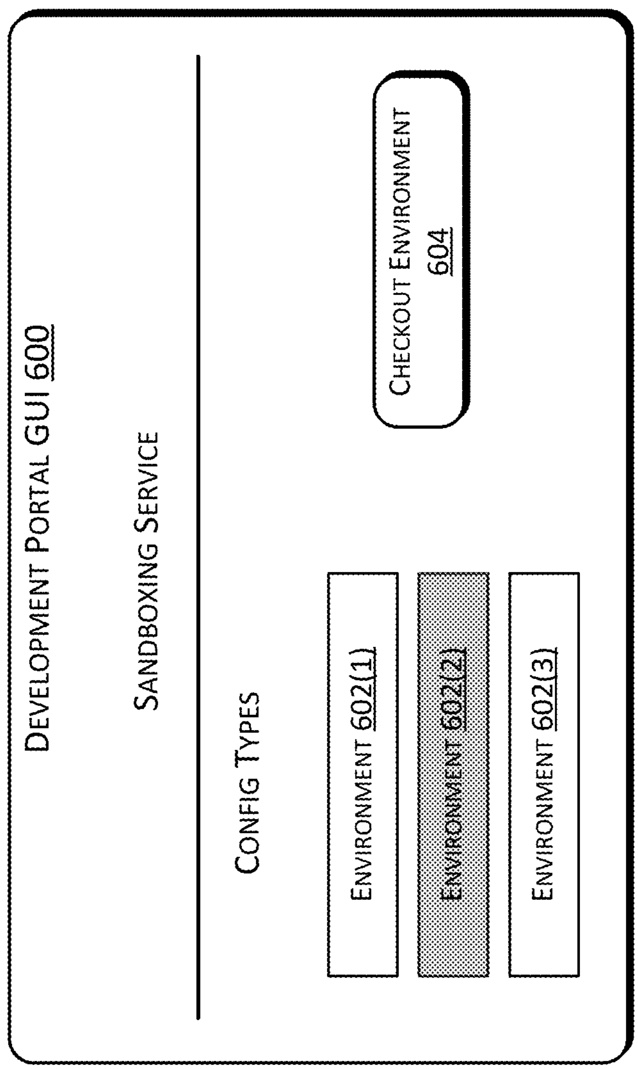
FIG. 6 illustrates an example development portal graphical user interface (GUI) directed to enabling a developer to check out one of a different number of test environments based on type.

FIG. 6 illustrates an example development portal graphical user interface (GUI) 600 directed to enabling a developer to check out one of a different number of test environments 602(1)-602(3) based on type. As shown a user can select one of the test environments (602(2)) and then officially request a checkout via the GUI element 604.

Figure 7:
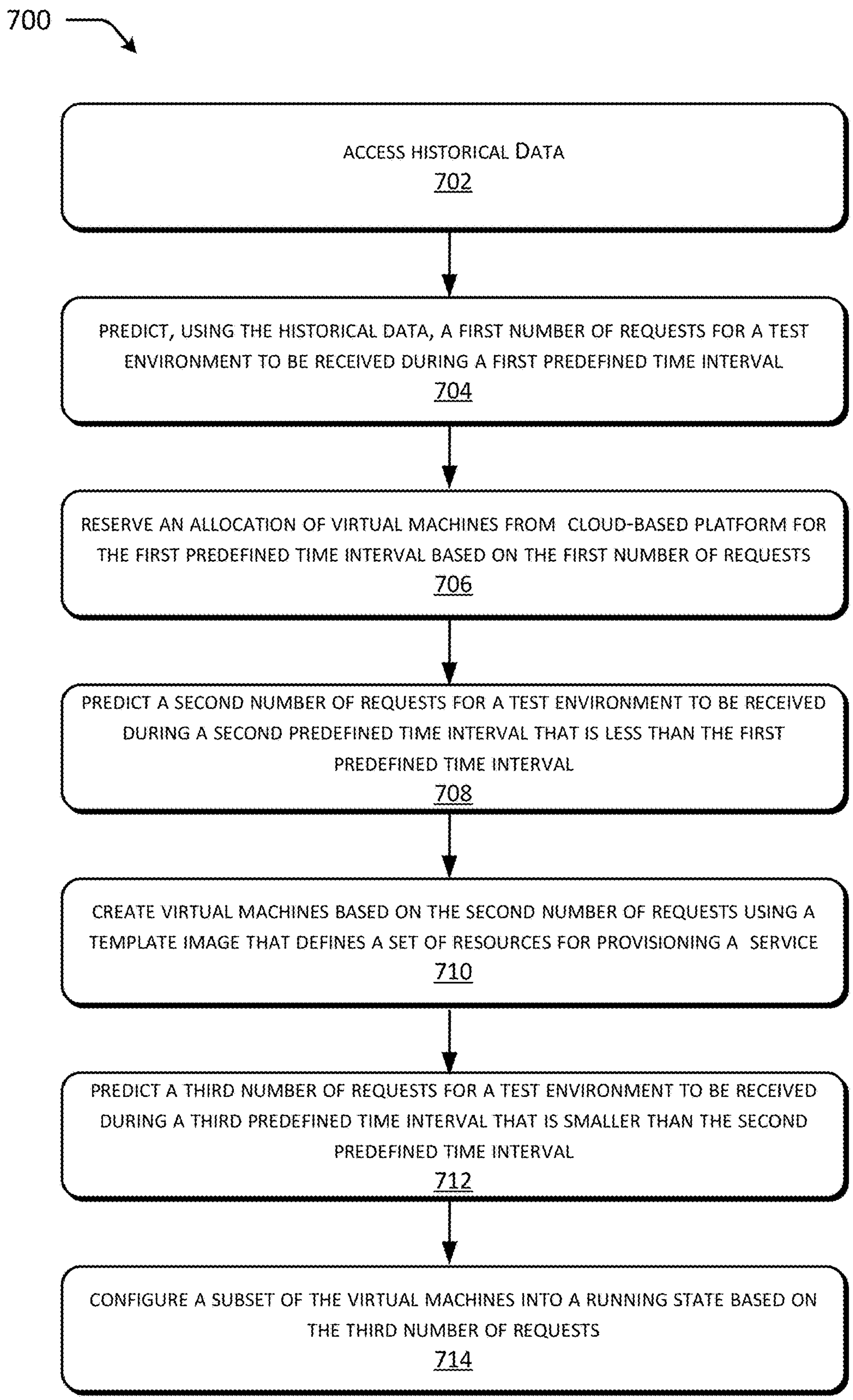
FIG. 7 is a flow diagram of an example method for predicting a set of anticipated requests according to different time intervals and creating different virtual machine pools based on the predictions.
Figure 8:
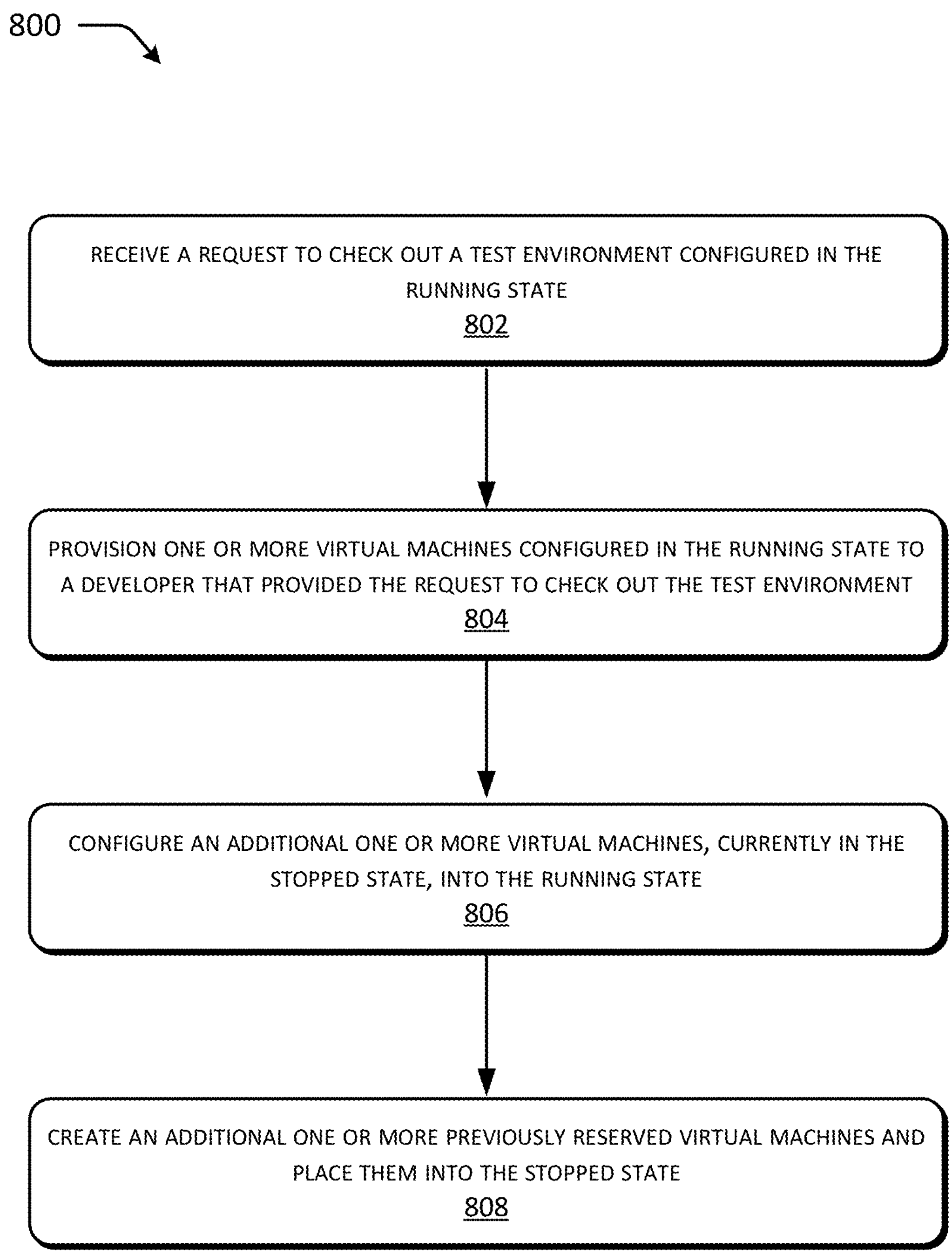
FIG. 8 is a flow diagram of an example method for managing different virtual machine pools based on an occurrence of a checkout.

FIGS. 7 and 8 are flow diagrams illustrating routines describing aspects of the present disclosure. The logical operations described herein with regards to any one of FIGS. 7 and 8 can be implemented (1) as a sequence of computer implemented acts or program modules running on a device and/or (2) as interconnected machine logic circuits or circuit modules within a device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

FIG. 7 is a flow diagram of an example method 700 for predicting a set of anticipated requests according to different time intervals and creating different virtual machine pools based on the predictions.

At operation 702, historical data that includes information about previous checkout requests for test environment is accessed.

At operation 704, a first number of requests for a test environment to be received during a first predefined time interval (e.g., one day) is predicted using the historical data.

At operation 706, an allocation of virtual machines is reserved from a cloud-based platform for the first predefined time interval based on the first number of requests. This reservation can be based on a predetermined number of virtual machines that correspond to a particular type of test environment (e.g., template image).

At operation 708, a second number of requests for a test environment to be received during a second predefined time interval that is less than the first predefined time interval is predicted using the historical data.

At operation 710, virtual machines based on the second number of requests are created. As described above, each of the virtual machines is created using a template image that defines a set of resources for provisioning a network service.

At operation 712, a third number of requests for a test environment to be received during a third predefined time interval that is smaller than the second predefined time interval is predicted.

At operation 714, a subset of the virtual machines is configured into a running state based on the third number of requests.

FIG. 8 is a flow diagram of an example method 800 for managing different virtual machine pools based on an occurrence of a checkout. The operations in the example method 800 may be performed after and/or in conjunction with the operations in the example method 700.

At operation 802, a request to check out a test environment configured in the running state is received.

At operation 804, one or more virtual machines configured in the running state are provisioned to a developer that provided the request to check out the test environment.

At operation 806, an additional one or more virtual machines currently in the stopped state are configured into the running state, to take the place of the one or more virtual machines provisioned for the checkout.

At operation 808, an additional one or more of the previously reserved virtual machines are created and placed into the stopped state.

Figure 9:
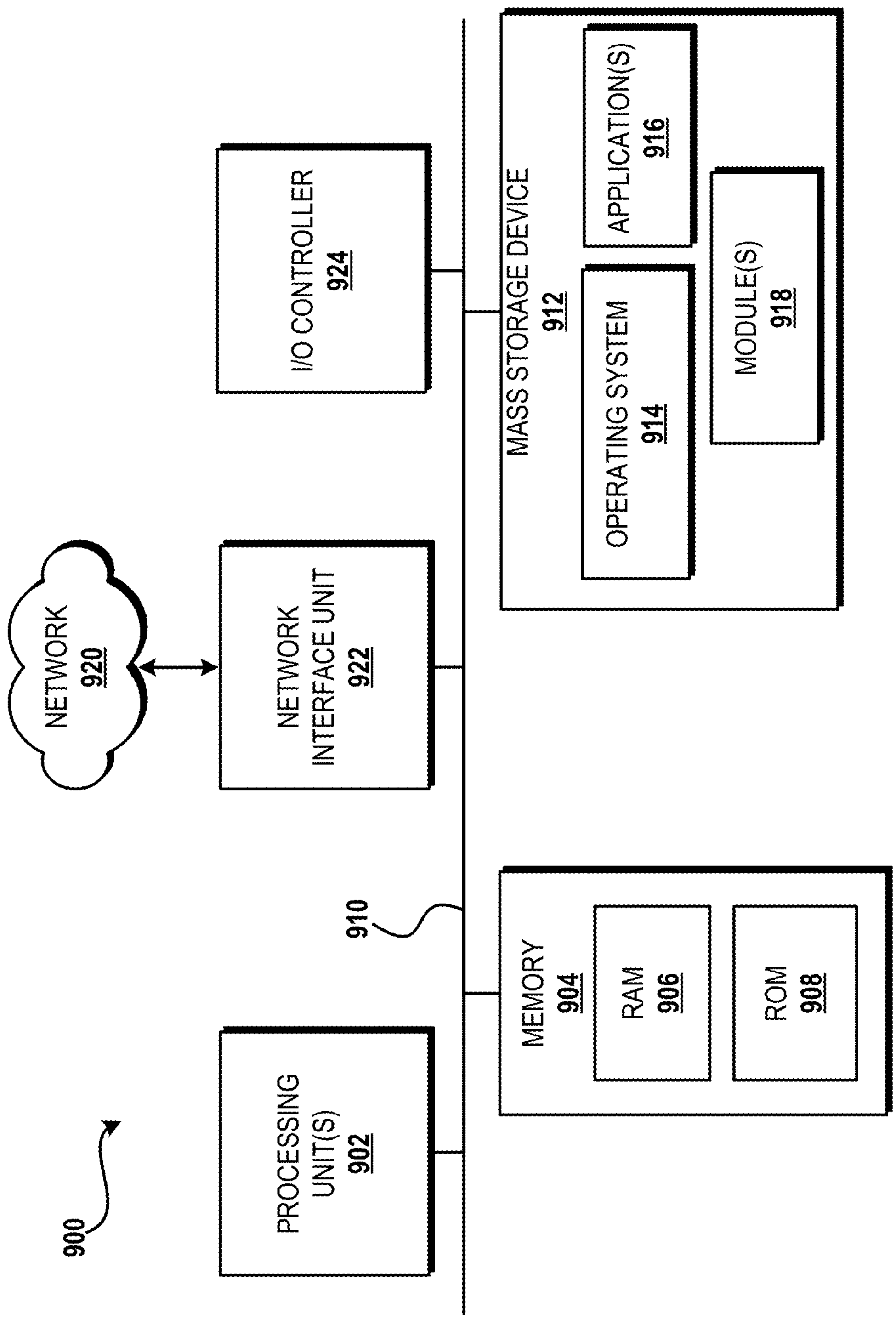
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a device, such as a computer or a server configured as part of the system 102, capable of executing computer instructions (e.g., a module or a program component described herein). The computer architecture 900 illustrated in FIG. 9 includes processing unit(s) 902, a system memory 904, including a random-access memory 906 ("RAM") and a read-only memory ("ROM") 908, and a system bus 910 that couples the memory 904 to the processing unit(s) 902.

Processing unit(s), such as processing unit(s) 902, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918 (e.g., the pool manager module 122, the prediction module 124), and other data described herein.

The mass storage device 912 is connected to processing unit(s) 902 through a mass storage controller connected to the bus 910. The mass storage device 912 and its associated computer-readable media provide non-volatile storage for the computer architecture 900. Although the description of computer-readable media contained herein refers to a mass storage device, it should be appreciated by those skilled in the art that computer-readable media can be any available computer-readable storage media or communication media that can be accessed by the computer architecture 900.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910. The computer architecture 900 also may include an input/output controller 924 for receiving and processing input from a number of other devices, including a keyboard, mouse, touch, or electronic stylus or pen. Similarly, the input/output controller 924 may provide output to a display screen, a printer, or other type of output device.

It should be appreciated that the software components described herein may, when loaded into the processing unit(s) 902 and executed, transform the processing unit(s) 902 and the overall computer architecture 900 from a general-purpose computing system into a special-purpose computing system customized to facilitate the functionality presented herein. The processing unit(s) 902 may be constructed from any number of transistors or other discrete circuit elements, which may individually or collectively assume any number of states. More specifically, the processing unit(s) 902 may operate as a finite-state machine, in response to executable instructions contained within the software modules disclosed herein. These computer-executable instructions may transform the processing unit(s) 902 by specifying how the processing unit(s) 902 transition between states, thereby transforming the transistors or other discrete hardware elements constituting the processing unit(s) 902.

Figure 10:
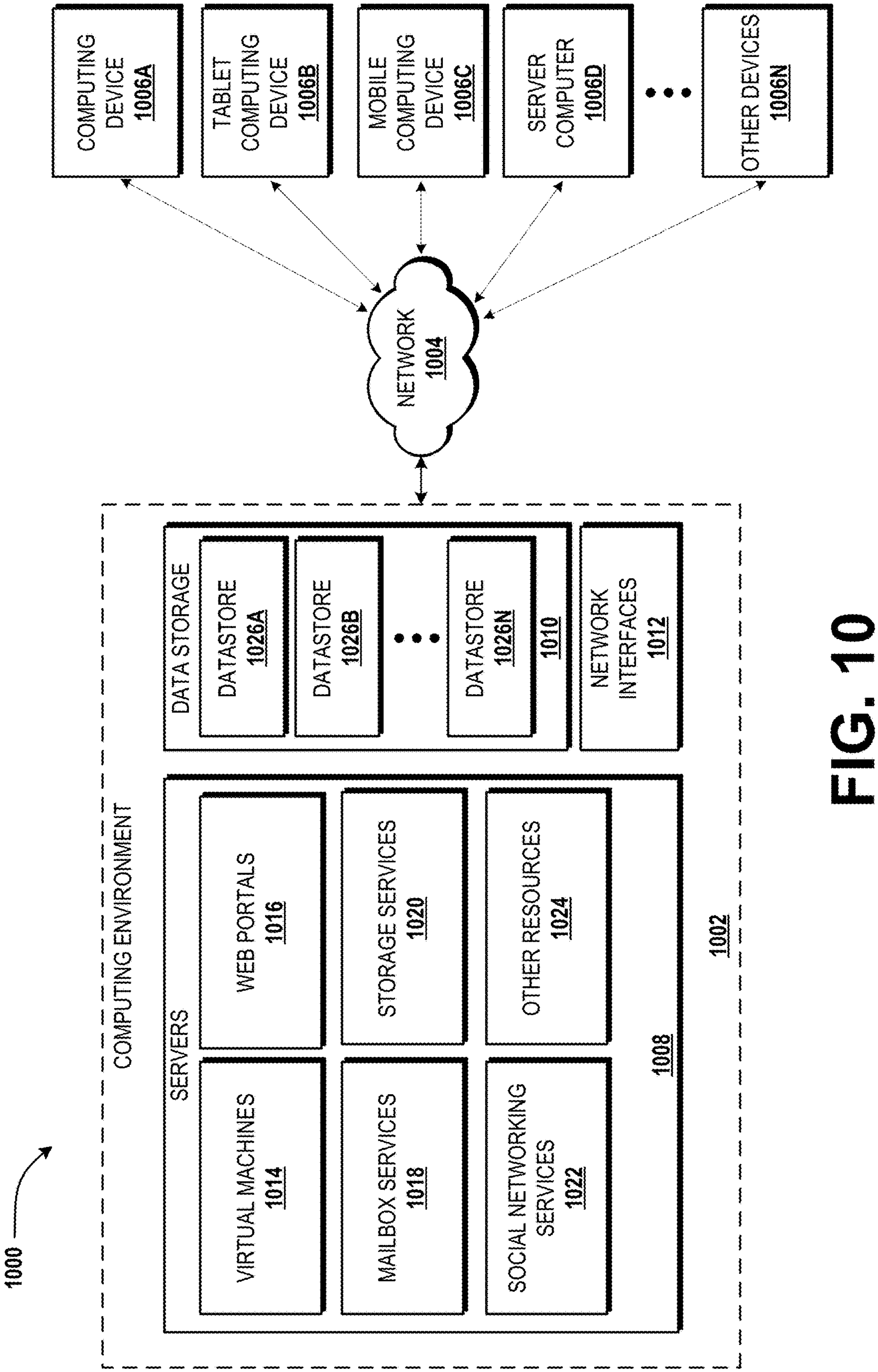
FIG. 10 is a diagram illustrating a distributed computing environment capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein.

Accordingly, the distributed computing environment 1000 can include a computing environment 1002 operating on, in communication with, or as part of the network 1004. The network 1004 can include various access networks. One or more client devices 1006A-1006N (hereinafter referred to collectively and/or generically as "clients 1006" and also referred to herein as computing devices 1006) can communicate with the computing environment 1002 via the network 804. In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002.

In various examples, the computing environment 1002 includes servers 1008, data storage 1010, and one or more network interfaces 1012. The servers 1008 can host various services, virtual machines, portals, and/or other resources. In the illustrated configuration, the servers 1008 host virtual machines 1014, Web portals 1016, mailbox services 1018, storage services 1020, and/or social networking services 1022. As shown in FIG. 10, the servers 1008 also can host other services, applications, portals, and/or other resources ("other resources") 1024.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more servers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the servers 1008 and/or other data. That is, the datastores 1026 also can host or store web page documents, word documents, presentation documents, data structures, algorithms for execution by a recommendation engine, and/or other data utilized by any application program. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects.

The disclosure presented herein also encompasses the subject matter set forth in the following clauses.

Example Clause A, a method comprising: predicting, by a sandbox service executed on one or more processing units, a first number of requests for a test environment to be received during a first predefined time interval, wherein an individual request is for using the test environment to test a feature of a network service before deploying the feature to a set of servers that provide the network service; creating, by the sandbox service, a plurality of virtual machines based on the first number of requests, wherein each of the plurality of virtual machines is created using a template image that defines a set of resources for provisioning the network service so that the feature of the network service can be tested; predicting, by the sandbox service, a second number of requests for a test environment to be received during a second predefined time interval that is smaller than the first predefined time interval; configuring, by the sandbox service, a subset of the plurality of virtual machines into a running state based on the second number of requests; receiving, by the sandbox service, a request to check out a test environment configured in the running state; based on receiving the request to check out the test environment: provisioning one or more virtual machines configured in the running state to a developer that provided the request to check out the test environment; and configuring an additional one or more of the plurality of virtual machines into the running state.

Example Clause B, the method of Example Clause A, wherein the running state allows for instant use of a virtual machine by a developer without delay.

Example Clause C, the method of Example Clause B, wherein an individual virtual machine that is created but not in the running state is in a stopped state enabling compute costs to be avoided.

Example Clause D, the method of Example Clause C, further comprising: establishing a threshold number of virtual machines to maintain in the running state based on the second number; and establishing a second threshold number of virtual machines to maintain in the stopped state based on the first number.

Example Clause E, the method of any one of Example Clauses A through D, wherein the plurality of virtual machines are created from a reserved number of virtual machines requested by the sandbox service to accommodate an expected number of requests for a third predefined time interval that is greater than the first predefined time interval, and the method further comprises creating an additional virtual machine from the reserved number of virtual machines based on receiving the request to check out the virtual machine configured in the running state.

Example Clause F, the method of any one of Example Clauses A through E, wherein the predicting the first number of requests for a test environment to be received during the first predefined time interval and the predicting the second number of requests for a test environment to be received during the second predefined time interval is based on accessing historical data for test environment checkouts.

Example Clause G, the method of Example Clause G, wherein the historical data includes metadata for previous checkouts, the metadata indicating at least one of a time-of-day for a previous checkout, a total number of developers in a geographic location associated with a previous checkout, whether a previous checkout occurs during an event, or a type of test environment associated with a previous checkout.

Example Clause H, the method of any one of Example Clauses A through G, wherein the template image is created for a specific type of test environment amongst a plurality of different types of test environments.

Example Clause I, the method of Example Clause H, wherein the specific type of test environment relates to a build for the network service.

Example Clause J, the method of Example Clause I, wherein the sandbox service maintains different template images for a predefined number of most recent builds for the network service.

Example Clause K, a system comprising: one or more processing units; and computer-readable storage media storing instructions, that when executed by the one or more processing units, configure the system to perform operations comprising: predicting a first number of requests for a test environment to be received during a first predefined time interval, wherein an individual request is for using the test environment to test a feature of a network service before deploying the feature to a set of servers that provide the network service; creating a plurality of virtual machines based on the first number of requests, wherein each of the plurality of virtual machines is created using a template image that defines a set of resources for provisioning the network service so that the feature of the network service can be tested; predicting a second number of requests for a test environment to be received during a second predefined time interval that is smaller than the first predefined time interval; and configuring a subset of the plurality of virtual machines into a running state based on the second number of requests.

Example Clause L, the system of Example Clause K, wherein the operations further comprise: receiving a request to check out a test environment configured in the running state; based on receiving the request to check out the test environment: provisioning one or more virtual machines configured in the running state to a developer that provided the request to check out the test environment; and configuring an additional one or more of the plurality of virtual machines into the running state.

Example Clause M, the system of Example Clause K or Example Clause L, wherein the running state allows for instant use of a virtual machine by a developer without delay.

Example Clause N, the system of Example Clause M, wherein an individual virtual machine that is created but not in the running state is in a stopped state enabling compute costs to be avoided.

Example Clause O, the system of any one of Example Clauses K through N, wherein the predicting the first number of requests for a test environment to be received during the first predefined time interval and the predicting the second number of requests for a test environment to be received during the second predefined time interval is based on accessing historical data for test environment checkouts.

Example Clause P, the system of Example Clause O, wherein the historical data includes metadata for previous checkouts, the metadata indicating at least one of a time-of-day for a previous checkout, a total number of developers in a geographic location associated with a previous checkout, whether a previous checkout occurs during an event, or a type of test environment associated with a previous checkout.

Example Clause Q, the system of any one of Example Clauses K through P, wherein the template image is created for a specific type of test environment amongst a plurality of different types of test environments.

Example Clause R, the system of Example Clause Q, wherein the specific type of test environment relates to at least one of a build for the network service, a use case, or an operating system version.

Example Clause S, a system comprising: one or more processing units; and computer-readable storage media storing instructions, that when executed by the one or more processing units, configure the system to perform operations comprising: establishing a first threshold number of virtual machines to maintain in a running state based on a first predicted number of checkout requests to be received during a first predefined time interval; establishing a second threshold number of virtual machines to maintain in a stopped state based on a second predicted number of checkout requests to be received during a second predefined time interval that is greater than the first predefined time interval; and managing pools of virtual machines, to be provided to developers as part of test environments, using the first threshold number and the second threshold number.

Example Clause T, the system of Example Clause S, wherein the running state allows for instant use of a virtual machine by a developer without delay and the stopped state enables compute costs to be avoided.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different time intervals, two different predicted numbers, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method comprising:

predicting, by a sandbox service executed on one or more processing units, a first number of requests for a test environment to be received during a first predefined time interval, wherein an individual request is for using the test environment to test a feature of a network service before deploying the feature to a set of servers that provide the network service;

creating, by the sandbox service, a plurality of virtual machines based on the first number of requests, wherein each of the plurality of virtual machines is created using a template image that defines a set of resources for provisioning the network service so that the feature of the network service can be tested;

predicting, by the sandbox service, a second number of requests for a test environment to be received during a second predefined time interval that is smaller than the first predefined time interval;

configuring, by the sandbox service, a subset of the plurality of virtual machines into a running state based on the second number of requests;

receiving, by the sandbox service, a request to check out a test environment configured in the running state;

based on receiving the request to check out the test environment:

provisioning one or more virtual machines configured in the running state to a developer that provided the request to check out the test environment; and configuring an additional one or more of the plurality of virtual machines into the running state.

2. The method of claim 1, wherein the running state allows for instant use of a virtual machine by a developer without delay.

3. The method of claim 2, wherein an individual virtual machine that is created but not in the running state is in a stopped state enabling compute costs to be avoided.

4. The method of claim 3, further comprising:

establishing a threshold number of virtual machines to maintain in the running state based on the second number; and establishing a second threshold number of virtual machines to maintain in the stopped state based on the first number.

5. The method of claim 1, wherein the plurality of virtual machines are created from a reserved number of virtual machines requested by the sandbox service to accommodate an expected number of requests for a third predefined time interval that is greater than the first predefined time interval, and the method further comprises creating an additional virtual machine from the reserved number of virtual machines based on receiving the request to check out the virtual machine configured in the running state.

6. The method of claim 1, wherein the predicting the first number of requests for a test environment to be received during the first predefined time interval and the predicting the second number of requests for a test environment to be received during the second predefined time interval is based on accessing historical data for test environment checkouts.

7. The method of claim 6, wherein the historical data includes metadata for previous checkouts, the metadata indicating at least one of a time-of-day for a previous checkout, a total number of developers in a geographic location associated with a previous checkout, whether a previous checkout occurs during an event, or a type of test environment associated with a previous checkout.

8. The method of claim 1, wherein the template image is created for a specific type of test environment amongst a plurality of different types of test environments.

9. The method of claim 8, wherein the specific type of test environment relates to a build for the network service.

10. The method of claim 9, wherein the sandbox service maintains different template images for a predefined number of most recent builds for the network service.

11. A system comprising:

one or more processing units; and computer-readable storage media storing instructions, that when executed by the one or more processing units, configure the system to perform operations comprising:

predicting a first number of requests for a test environment to be received during a first predefined time interval, wherein an individual request is for using the test environment to test a feature of a network service before deploying the feature to a set of servers that provide the network service;

creating a plurality of virtual machines based on the first number of requests, wherein each of the plurality of virtual machines is created using a template image that defines a set of resources for provisioning the network service so that the feature of the network service can be tested;

predicting a second number of requests for a test environment to be received during a second predefined time interval that is smaller than the first predefined time interval; and configuring a subset of the plurality of virtual machines into a running state based on the second number of requests.

12. The system of claim 11, wherein the operations further comprise:

receiving a request to check out a test environment configured in the running state;

based on receiving the request to check out the test environment:

provisioning one or more virtual machines configured in the running state to a developer that provided the request to check out the test environment; and configuring an additional one or more of the plurality of virtual machines into the running state.

13. The system of claim 11, wherein the running state allows for instant use of a virtual machine by a developer without delay.

14. The system of claim 13, wherein an individual virtual machine that is created but not in the running state is in a stopped state enabling compute costs to be avoided.

15. The system of claim 11, wherein the predicting the first number of requests for a test environment to be received during the first predefined time interval and the predicting the second number of requests for a test environment to be received during the second predefined time interval is based on accessing historical data for test environment checkouts.

16. The system of claim 15, wherein the historical data includes metadata for previous checkouts, the metadata indicating at least one of a time-of-day for a previous checkout, a total number of developers in a geographic location associated with a previous checkout, whether a previous checkout occurs during an event, or a type of test environment associated with a previous checkout.

17. The system of claim 11, wherein the template image is created for a specific type of test environment amongst a plurality of different types of test environments.

18. The system of claim 17, wherein the specific type of test environment relates to at least one of a build for the network service, a use case, or an operating system version.

19. A system comprising:

one or more processing units; and computer-readable storage media storing instructions, that when executed by the one or more processing units, configure the system to perform operations comprising:

establishing a first threshold number of virtual machines to maintain in a running state based on a first predicted number of checkout requests to be received during a first predefined time interval;

establishing a second threshold number of virtual machines to maintain in a stopped state based on a second predicted number of checkout requests to be received during a second predefined time interval that is greater than the first predefined time interval; and managing pools of virtual machines, to be provided to developers as part of test environments, using the first threshold number and the second threshold number.

20. The system of claim 19, wherein the running state allows for instant use of a virtual machine by a developer without delay and the stopped state enables compute costs to be avoided.

* * * * *